United States Patent [19]

Cline

[11] Patent Number: 4,971,347

[45] Date of Patent: Nov. 20, 1990

[54] MOTORCYCLE KICK STAND ATTACHMENT

[76] Inventor: Jack B. Cline, 12827 Bromwich St., Arleta, Calif. 91331

[21] Appl. No.: 344,092

[22] Filed: Apr. 17, 1989

[51] Int. Cl.$^5$ .............................................. B62H 1/02
[52] U.S. Cl. .................................. 280/301; 280/763.1
[58] Field of Search ............... 280/293, 294, 295, 297, 280/288, 299, 300, 301, 302, 303, 304, 763.1

[56] References Cited

U.S. PATENT DOCUMENTS

| | | |
|---|---|---|
| 3,998,470 | 12/1976 | Hooston .............................. 280/301 |
| 4,084,656 | 4/1978 | Itoh et al. ............................ 280/293 |
| 4,417,746 | 11/1983 | Baron ................................... 280/301 |
| 4,625,987 | 12/1986 | Marsh .................................. 280/293 |
| 4,819,957 | 4/1989 | Printy .................................. 280/293 |

Primary Examiner—Charles A. Marmor
Assistant Examiner—Victor E. Johnson
Attorney, Agent, or Firm—Jack C. Munro

[57] ABSTRACT

An attachment for a kick stand of a motorcycle which substantially increases the support surface area of the kick stand when it is used to support the motorcycle in the upright position. The substantially increased surface area eliminates the possibility of penetration of the kick stand into a penetratable supportive surface. Automatic movement of the kick stand from its extended position to its retracted position causes a base plate to pivot to a stowed position spaced from the foot plate.

5 Claims, 2 Drawing Sheets

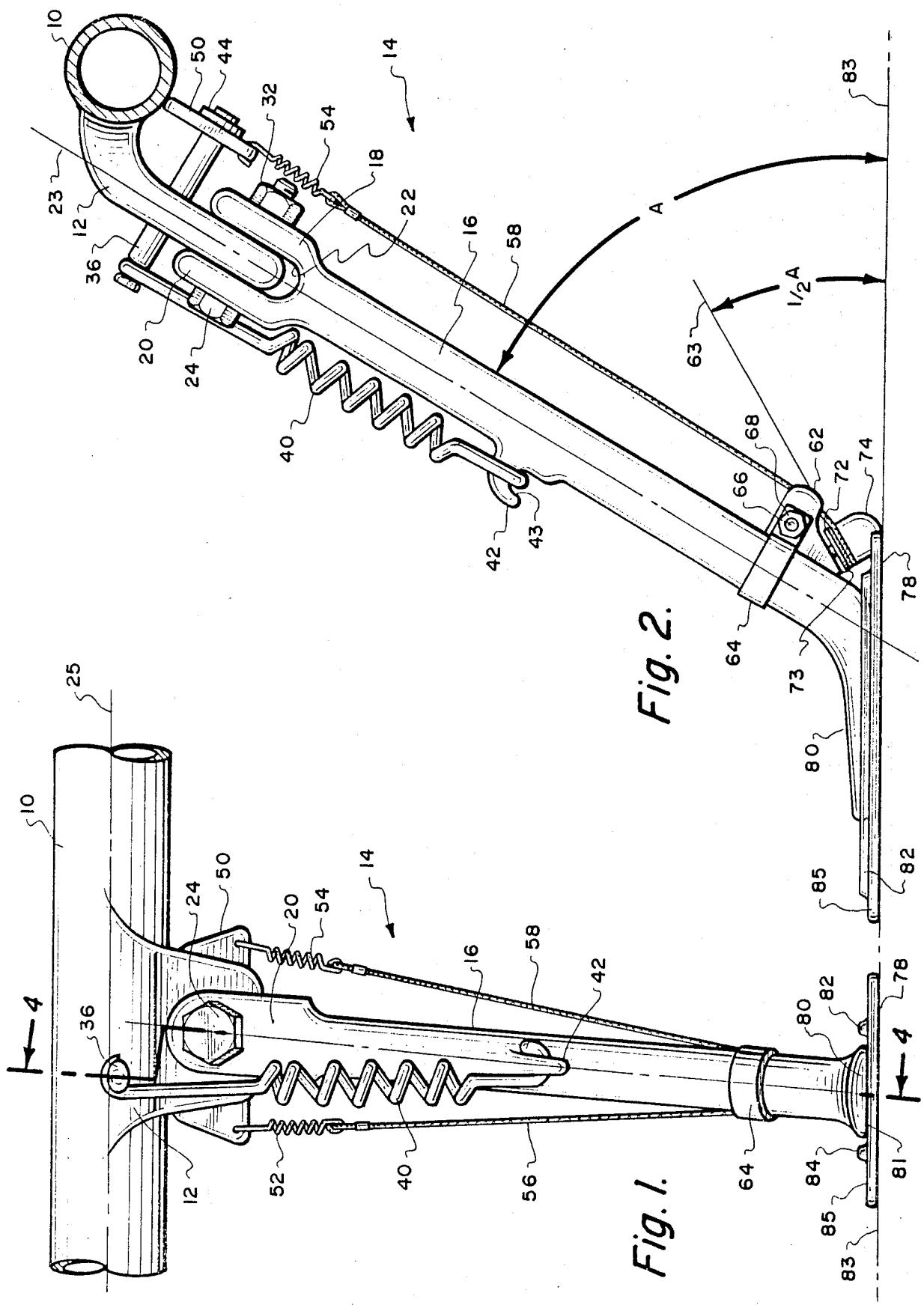

MOTORCYCLE KICK STAND ATTACHMENT

BACKGROUND OF THE INVENTION

The field of this invention relates to motorcycles and more particularly to an attachment to a motorcycle kick stand which substantially increases the supportive surface area of the kick stand when it is used.

It is common to support the motorcycle, when it is not being used, in the upright position. To so support a motorcycle, it is normal to use what is termed a "kick stand". A typical kick stand comprises an arm that is pivotally mounted to the frame of a motorcycle with this arm to be pivoted approximately ninety degrees from a retracted position to an extended position. The free outer end of the kick stand includes a foot plate. The kick stand is mounted by an over-center spring mechanism. The rider is to use a foot to cause the kick stand to be moved from the retracted position to the extended position (and vice versa). Hence the reason for the terminology "kick stand".

One of the major problems in conjunction with a conventional kick stand is that the foot plate has a bottom surface area of only about two to three square inches. It is not uncommon for a motorcycle to weight nine hundred pounds. This heavy weight in conjunction with this small surface area of the kick stand can cause the kick stand to penetrate the surface on which the motorcycle is located. Penetration of the surface will not occur if the surface is cement. However, if the surface is dirt or ravel, then penetration can easily occur and even on a hot day penetration easily occurs within asphalt. Once penetration has occurred, the motorcycle just tips over and comes to rest in a non-upright position upon the surface upon which it is located. Motorcyclists frequently take great care in keeping up the appearance of a motorcycle. When the motorcycle falls onto the surface upon which it is located, it almost invariably becomes damaged.

It is known that if the foot plate of the kick stand was enlarged to say ten times its normal surface area, it would be very unlikely that such tipping of the motorcycle would occur. However, when the kick stand is in its retracted position this would mean that the outer free end of the kick stand would protrude significantly from the side of the motorcycle. This protrusion would surely interfere with the operation of the motorcycle and also would be easily contactable by a leg of the motorcyclist during the time that the motorcyclist is getting on and off the motorcycle. Such a large foot plate could easily cause injury to the motorcyclist.

SUMMARY OF THE INVENTION

The structure of the present invention relates to an attachment to a conventional motorcycle kick stand which moves from a stowed position to a usable position with a substantially increased area base plate to be in direct contact with the supportive surface with the foot plate of the kick stand resting on the top surface of the base plate. During the time that the kick stand is moved from its extended position to its retracted position, this base plate is caused to be pivoted to an out-of-the-way position thereby not interfering or be contactable by any portion of the body of the motorcyclist during normal use of the motorcycle. This pivoting of the base plate is accomplished automatically through the use of a cable assembly which connects the base plate to the motorcycle frame with this base plate being automatically pivoted into position during the normal pivoting of the kick stand from its retracted position to its extended position.

The primary objective of the present invention is to construct an attachment for a motorcycle kick stand which will substantially enlarge the weight supporting surface area of the kick stand to prevent the kick stand from penetrating the supporting surface upon which it is resting during the time that the motorcycle is not being used.

Another objective of the present invention is to construct an attachment for a motorcycle kick stand which is moved to an out-of-the-way position during the time the kick stand is in the retracted position and is not being used.

Another objective of the present invention is to construct an attachment which is automatically moved into its usable position during the normal movement of the kick stand from its retracted position to its extended position.

Another objective of the present invention is to construct an attachment which can be purchased by the ultimate consumer in kit form and be quickly and easily mounted in conjunction with a kick stand of a motorcycle.

Another objective of the present invention is to construct an attachment which is composed of few parts and can be manufactured inexpensively and therefore sold to the ultimate consumer at a relatively inexpensive price.

BRIEF DESCRIPTION OF THE DRAWINGS

FIG. 1 is a front elevational view of a typical conventional motorcycle kick stand upon which the attachment of the present invention is incorporated showing the kick stand in the extended position;

FIG. 2 is a right side view of FIG. 1;

DETAILED DESCRIPTION OF THE SHOWN EMBODIMENT

Referring particularly to the drawings, there is shown a tubular frame member 10 of a motorcycle frame which is not shown in total. This frame 10 to be located at the bottom of the motorcycle (not shown). Frame member 10 includes an integral outwardly extending flange 12. To this outwardly extending flange 12 there is to be fixedly mounted a conventional kick stand and the attachment 14 of this invention.

Figure 3:
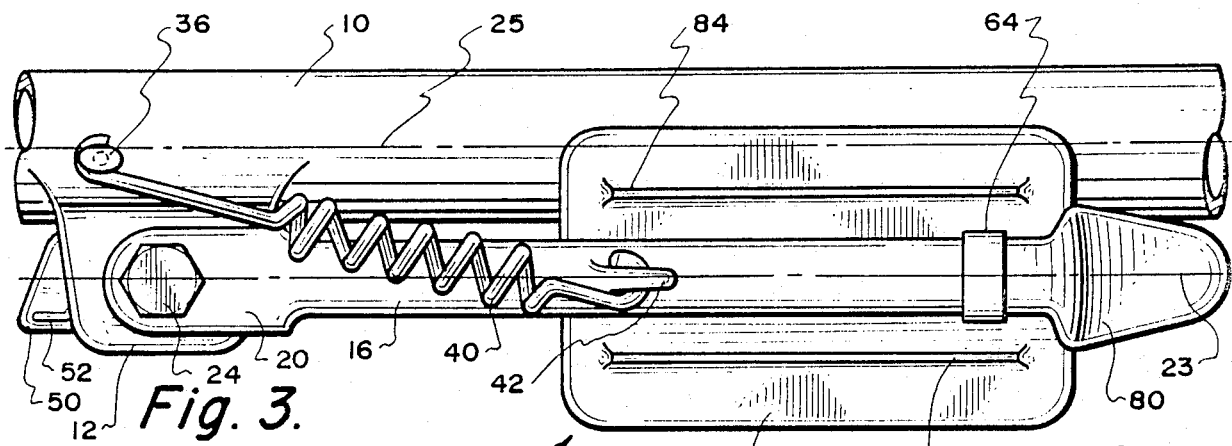
FIG. 3 is a view similar to FIG. 1 but showing the motorcycle kick stand in the retracted position.
Figure 5:
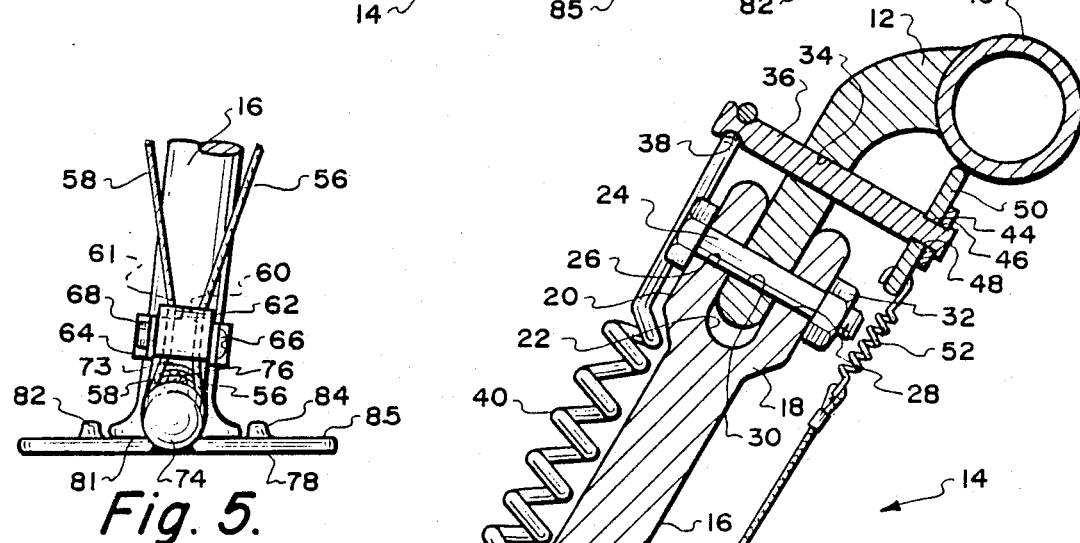
FIG. 5 is a back view of a portion of the attachment of the present invention taken along line 5—5 of FIG. 4.
Figure 4:
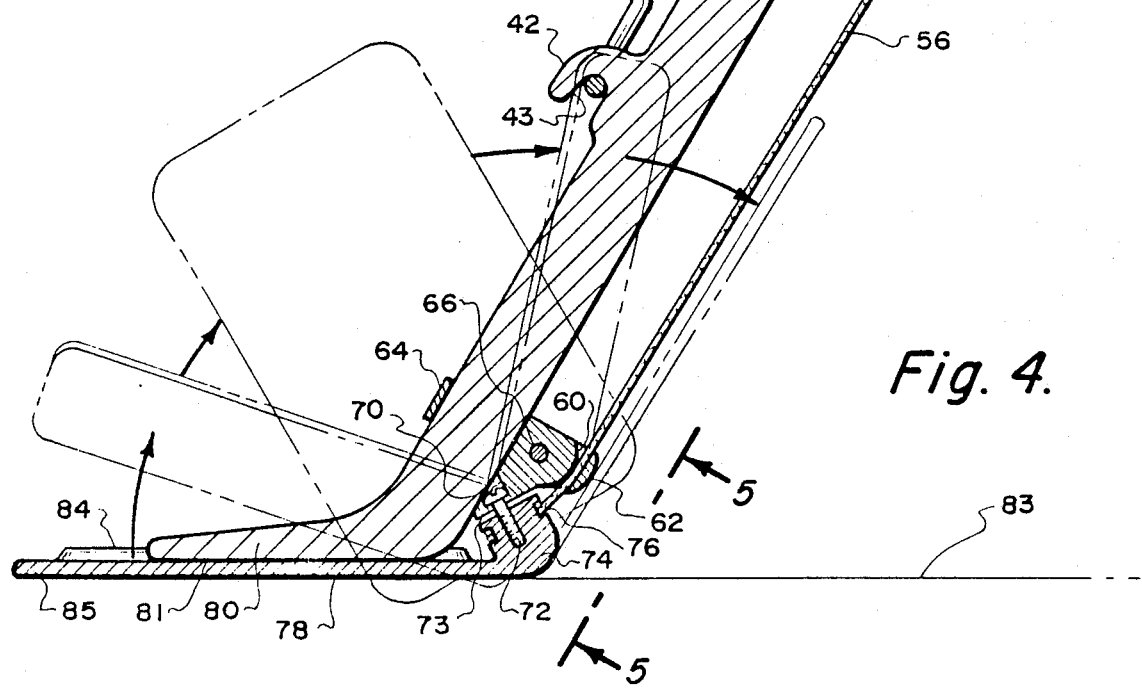
FIG. 4 is a cross-sectional view taken along line 4—4 of FIG. 1 depicting the movement of the attachment to its stowage position during the movement of the kick stand to the retracted position.

The conventional kick stand is primarily defined by elongated arm 16. The inner end of the arm 16 is bifurcated forming legs 18 and 20 with therebeing a narrow gap 22 formed therebetween. The flange 12 has formed therethrough a pair of spaced apart through openings 30 and 34. Formed within the legs 18 and 20, respectively, are a pair of through holes 26 and 28. The flange 12 is to be located within the gap 22 so that the holes 26, 28 and 30 are in alignment. Connecting with this aligned series of holes is a conventional bolt fastener 24, the outer end of which is connected to a conventional fastener nut 32. The bolt fastener 24 functions as a pivot pin with the arm 16 capable of pivoting from a retracted position shown in FIG. 3 to an extended position shown in FIGS. 1, 2 and 4. In the retracted position, the longitudinal center axis 23 of the arm 16 is located parallel to the longitudinal center axis 25 of the tubular member 10. With the arm 16 in the extended position, the longitudinal center axis 23 is substantially located perpendicular to the longitudinal center axis 25.

Connecting with hole 34 is an elongated pin 36. The outer end of the pin 36 includes an annular recess 38. Connecting with the recess 38 is one end of coil spring 40. The opposite end of the coil spring 40 is located within recess 43 of a hook member 42. Hook member 42 is integrally formed on the arm 16.

Referring particularly to FIG. 1, it is to be noticed that the spring 40 is oriented off-center relative to the longitudinal center axis 23. The reason for this is to provide an over center action between the tubular member 10 and the arm 16. In the position of FIG. 1, the spring 40 functions to hold the arm 16 in the position shown in FIG. 1. There is a stop employed (not shown) which prevents the arm 16 from pivoting any further clockwise. Only counterclockwise movement of the arm 16 is permitted within FIG. 1 so that the arm 16 can be moved to the position shown in FIG. 3. When in the position of FIG. 3, the spring 40 now functions to hold the arm 16 in the established position of FIG. 3. In other words, the spring 40 functions to hold the arm 16 in the retracted position and also functions to hold the arm 16 in the extended position. This means that a manual force, generally in the form of a human foot, is to be used to move the arm 16 from the retracted to the extended position and also to move the arm 16 from the extended to the retracted position.

The outer end of the arm 16 terminates into an outwardly turned foot plate 80. This foot plate 80 has a substantially planar bottom surface 81. This bottom surface 81 is to be normally placed against a supportive surface 83. The bottom surface 81 is to provide the third point of support for the motorcycle with the first and second points of support being the wheels of the motorcycle. By having three in number of points of support, it is the intention that tipping over of the motorcycle is now prevented.

However, the actual surface area of the bottom surface 81 is so small in size that tipping over of the motorcycle can frequently occur. It is not at all uncommon for the foot plate 80 to actually penetrate the supportive surface 83 if the supportive surface 83 is composed of dirt, gravel or asphalt. It is the intention of the subject matter of this invention to provide an attachment to the kick stand, defined primarily as arm 16, so to substantially increase the area of support of the bottom surface 81 and thereby prevent the tipping over of the motorcycle.

With arm 16 in the extended position, the bottom surface 81 is to abut directly against a top surface 85 of a base plate 78. The base plate 78 is formed of a rigid sheet material such as steel or aluminum being preferred. As is apparent within FIG. 3 of the drawings, the size of the top surface 85 is approximately ten to twelve times the size of the bottom surface 81. To facilitate the locating of the bottom surface 81 against the top surface 85 and to be centrally located transversely relative to the base plate 85 there is formed on the top surface 85 a pair of spaced apart ribs 82 and 84. It is between these ribs 82 and 84 that the foot plate 80 is to be located. It is to be understood that instead of the bottom surface 81 of the foot plate 80 resting on the supportive surface 83 that the bottom of the base plate 78 will rest directly on the supportive surface 83.

The back edge of the base plate 78 is integrally attached to a cylindrical knob 74. Within the exterior surface of the knob 74 there is located an annular recess 76. Connecting with the knob 74 is a conventional bolt fastener 72. The head of the fastener 72 is located within a recess 70 of a block 62. It is to be noted that the fastener 72 locates the knob 74 in a slightly spaced distance from the block 62, forming gap 73, with the knob 74 and its connected base plate 78 being readily pivotable relative to block 62.

The block 62 is to be fixedly mounted by a band 64 onto the arm 16. The fixing in position between the band 64 and the block 62 is by means of a conventional bolt fastener 66 and its connected nut 68.

The recess 76 coincides within a pivot plane 63. This pivot plane 63 is oriented at precisely one-half angle A with angle A being the angle from the supportive surface 83 to the arm 16. It is important that this angular relationship be maintained. Frequently, the arm 16 will be inclined at a sixty degree angle relative to the supportive surface 83 which means that the pivot plane 63 will be located at a thirty degree angle relative to the supportive surface 83. However, if angle A assumes another angular relationship, then the angle from the supportive surface 83 to the pivot plane 63 will also be located at one-half of that angle. The reason for this is that the base plate 78 pivots during movement of the arm 16 from the extended position shown in FIG. 1 to the retracted position shown in FIG. 3. It is desirable that during this pivoting movement, the base plate 78 now be located parallel to the longitudinal center axis 23 and this parallel relationship is clearly depicted in phantom lines within FIG. 4 of the drawings. If this precise angular relationship is not achieved, then the base plate 78 will not be located parallel to the longitudinal center axis 23 when in the retracted position.

Connecting with the recess 76 is a cable which is defined by a first end 56 and a second end 58. This cable is wrapped twice around the recess 76. First end 56 is connected to a short length coil spring 52. The second end 58 is connected to a similar short length coil spring 54. The first end 56 passes through a channel 60 formed within the block 62. The second end 58 passes through a channel 61 formed within the channel 60. It is to be noted that the channels 60 and 61 are separated so that the ends 56 and 58 do not rub against one another. Rubbing together of the ends 56 and 58 may restrict the pivotal movement of the base plate 78 from its usable position shown in FIG. 4 to its stowed position shown in FIG. 3.

The spring 52 is mounted directly adjacent one side of a plate 50. In a similar manner, the spring 54 is mounted within the plate 50 directly adjacent the opposite side of the plate 50. The plate 50 includes a centrally located hole 48. Pin 36 includes a smaller diametered section 46. The smaller diametered section 46 engages with the hole 48. Maintaining of this connection between the pin 36 and the plate 50 is accomplished by means of a lock washer 44. The lock washer 44 is mounted on the pin 36 within the area of the smaller diametered section 46.

The upper edge of the plate 50 is constantly held in a physical abutting relationship with the tube 10. No secure connection is required with only the physical abutting therebetween being sufficient. This physical abutting between the plate 50 and the tube 10 prevents any pivoting of the plate 50 therebetween.

During movement of the arm 16 from the extended position to the retracted position, the cable section 56 will be lengthened while the cable section 58 will be shortened. This lengthening and shortening is sufficient to cause the base plate 78 to pivot one hundred eighty degrees and assume in essence a reversely oriented position in the stowage position in the plate 78 as opposed to the usable position shown in FIGS. 1, 2 and 4 of the drawings. When it is desired to move the arm 16 from the retracted position to the extended position, the cable section 58 is now lengthened with the cable section 56 now being shortened. The reverse movement of the base plate 78 now occurs with the top surface 85 of the plate 78 sliding under the bottom surface 81 of the foot plate 80. During this sliding movement, minor deflections of the plate 78 are permitted provided by means of the gap 73 between the knob 74 and the block 62. A typical minor deflection will be the deflecting of the base plate 78 as the foot plate slides over ribs 82 and 84.

What is claimed is:

1. In combination with a motorcycle kick stand mounted on the frame of a motorcycle, said kick stand having an arm pivotable between an extended position and a retracted position, said retracted position being when said kick stand is in juxtaposition with a portion of said frame of said motorcycle, said arm having a free outer end terminating in foot plate, said foot plate having a substantially planar bottom surface adapted to rest on a supportive surface when said arm is in said extended position thereby maintaining said motorcycle in an upright position, the improvement comprising:

a sheet material base plate, a fastener having a pivot axis mounting said base plate on said arm, said base plate having a top substantially planar surface, said top surface being substantially larger in size than said bottom surface, said base plate being movable between a usable position and a stowed position, said usable position being when said top surface abuts against said bottom surface, said stowed position being when said base plate is spaced from said foot plate and located between said arm and said frame; and means for pivotally moving said base plate one hundred and eighty degrees between said usable position and said stowed position about said pivot axis of said fastener.

2. The combination as defined in claim 1 wherein:
   with said base plate in said stowed position, said top surface being located substantially parallel to the longitudinal center axis of said arm.

3. The combination as defined in claim 2 wherein:
   said means comprising a cable assembly, said cable assembly connecting with said frame of the motorcycle, said cable assembly including a section of cable in a single continuous length, a knob attached to said base plate, said section of cable being wound around said knob, during movement of said kick stand between said extended position and said retracted position the said base plate is automatically moved by said cable assembly between said usable position and said stowed position with winding and unwinding of said section of cable occurring on said knob resulting in said knob assuming a different position on said section of cable.

4. The combination as defined in claim 3 wherein:
   said top surface includes a pair of ribs, said ribs to assist in the locating of said base plate in its correct position relative to said foot plate when said base plate is in said usable position.

5. The combination as defined in claim 3 wherein:
   said cable assembly including spring means, said spring means connecting said section of cable to said frame.

* * * * *